(No Model.)

G. W. COLBATH.
CAR TRUCK AND AXLE.

No. 434,655.        Patented Aug. 19, 1890.

Witnesses
W. B. Howe
C. M. Ferrin

Inventor
George W. Colbath
By his Attorney J. B. Thurston

UNITED STATES PATENT OFFICE.

GEORGE W. COLBATH, OF CONCORD, NEW HAMPSHIRE.

CAR TRUCK AND AXLE.

SPECIFICATION forming part of Letters Patent No. 434,655, dated August 19, 1890.

Application filed January 31, 1889. Serial No. 298,180. (No model.)

*To all whom it may concern:*

Be it known that I, GEORGE W. COLBATH, a citizen of the United States, residing at Concord, in the county of Merrimac and State of New Hampshire, have invented certain new and useful Improvements in Car Trucks and Axles, of which the following is a specification.

The object of this invention is to lessen the friction between car-wheels and the rails when moving upon curves.

The invention consists in providing independent axles for each wheel and one additional axle-box secured to a central longitudinal beam or timber provided upon the truck for this purpose, adapted to carry the inner ends of the axles of one pair of wheels, all of which is clearly set forth in the following specification and claim, and fully illustrated in the accompanying drawings, forming an inseparable part thereof, of which—

Figure 1:
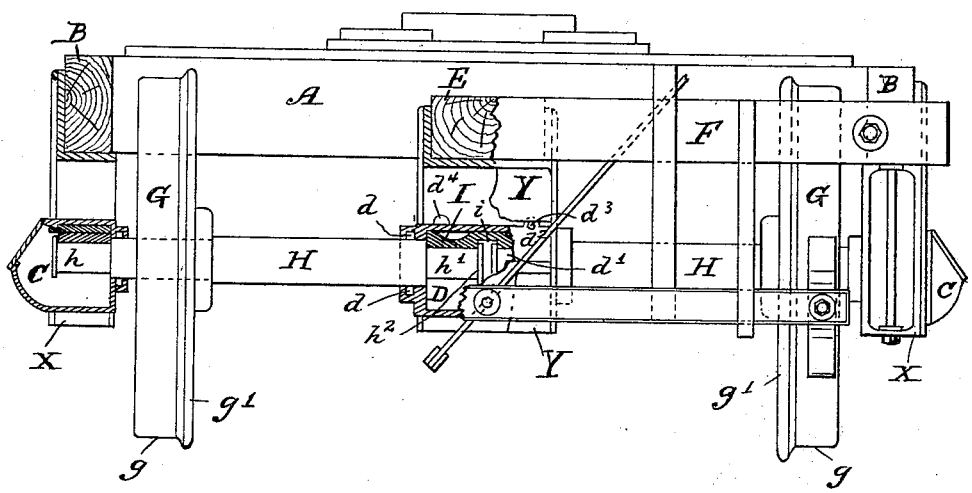
Figure 2:
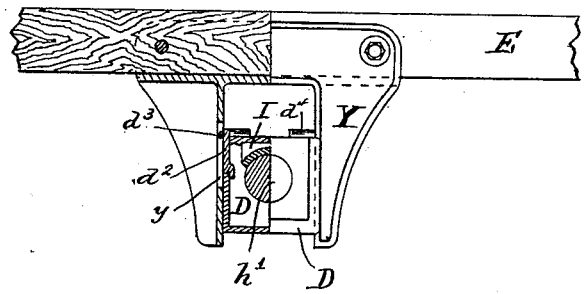

Figure 1 is a part end view and part cross-section of a truck embodying my improvements; and Fig. 2 is a broken side elevation and longitudinal sectional view of the center beam or timber, one of my improved center axle-boxes and its axle in position.

Similar letters indicate corresponding parts.

Heretofore, in order to partially overcome or equalize the force exerted upon the wheels upon one side of a car-truck at the moment it reaches a curve, the tread of the wheels have been formed tapering, the largest diameter of the wheel being near the flange and the smallest near or at the outer face, by which means the wheels on the outer rail of a curve must climb the rail—*i. e.*, move laterally thereon toward their increased diameter against the resistance of the entire load of the car. With my improved truck wheels having a perfectly flat tread may be used, and I consider them preferable, and by actual test I have demonstrated that a car carrying a given load and upon a given curve and provided with my improved truck and axles requires but two-thirds the power to haul it that the same car under the same circumstances and mounted upon the ordinary trucks requires to move it.

A is the ordinary truck-bolster.

B B are the ordinary side beams, to which are secured the jaws X for carrying the ordinary axle-boxes C C.

Axle-boxes D (one for each pair of wheels) are secured to a central longitudinal beam E, extending from one to the other of the end beams F, by which it may be supported.

Wheels G, which may have a perfectly flat face or tread $g$ and which are provided with the ordinary flange $g'$, are rigidly mounted each upon an independent axle H, having a journal at each end, those at their outside $h$ being carried in the axle-boxes C, and the journals $h'$ at their inner end being carried in the duplex axle-box D, which may be provided with two journal-bearings—one for each journal $h'$—or with a single long bearing I, as shown, resting upon the journals $h'$ of both axles H. The adjacent end of the journals $h'$ may be provided with a flange $h^2$, and the bearing I may be grooved, as at $i$, to admit said flanges.

The duplex boxes D are provided with a chamber $d$ at each end for the reception of a dust-guard. The jaws Y, which carry the duplex axle-boxes D, may have end openings $y$. Opposite to these, in either side of the axle-box D, are openings $d'$, for which covers $d^2$ are provided and secured thereon by means of a tongue extending from their bottom inside said box, and by screws $d^3$ passing through the upper edge of said covers and threaded to ears $d^4$, formed upon the top of the box D.

Having described my improvements, what I claim, and desire to secure by Letters Patent, is—

In a car-truck, the combination, with the ordinary axle-boxes, of the two independent axles, wheels rigidly mounted each upon one of said axles, a central longitudinal beam E, supported by the end beams of the truck, jaws or guides Y, carried by said beam, and a duplex axle-box mounted and vertically guided in said jaws and adapted to carry the adjacent ends of said axles, substantially as set forth.

In testimony whereof I affix my signature in presence of two witnesses.

GEORGE W. COLBATH.

Witnesses:
 J. B. THURSTON,
 J. H. ALBIN.